Nov. 8, 1960  F. G. WILSON  2,959,315
SLIDING CLOSURE FOR A PICNIC BASKET
Filed April 28, 1958

INVENTOR
FRANK G. WILSON
BY
ATT'Y.

United States Patent Office 2,959,315
Patented Nov. 8, 1960

2,959,315

SLIDING CLOSURE FOR A PICNIC BASKET

Frank G. Wilson, Putney, Vt.

Filed Apr. 28, 1958, Ser. No. 731,206

4 Claims. (Cl. 217—124)

This invention relates to a picnic basket. In particular it relates to a picnic basket in which the cover provided a flat eating surface.

Previously described picnic baskets in which the cover is intended to provide an eating surface are difficult to use. Those with hinged covers require removal of all objects on the cover when access into the basket is required. Those with removable covers are difficult to attach and detach and are often dropped accidentally. Further, such previously described picnic baskets usually lack sufficient rigidity, so that frequent operation of cover-opening distorts the basket, with attendant increase in problems of proper closing or locking.

One object of this invention is to provide a sturdy picnic basket having a cover which provides a flat eating surface, which does not require total removal of surface objects for access to the interior, which is easily opened and closed, which cannot be accidentally dislodged and yet is readily opened, and which is sturdy and non-distorting as regards the basket body.

Further objects and a fuller understanding of the invention will hereinafter appear from the following description of a preferred embodiment illustrative of the invention and shown in the accompanying drawings in which Figure 1 is a front view of basket with cover in closed position.

Figure 1:
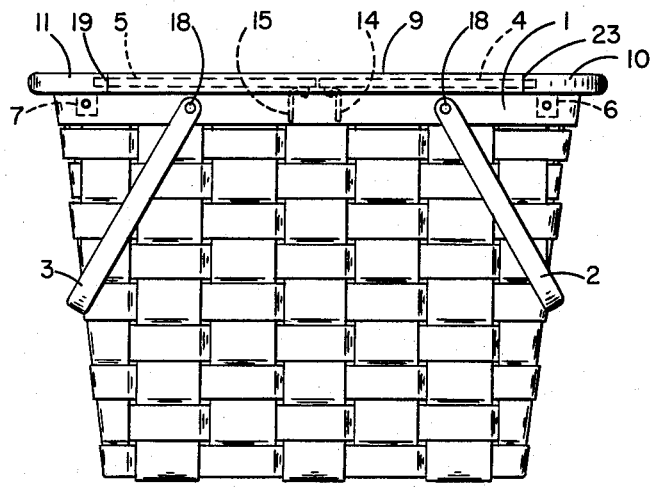
Figure 2:
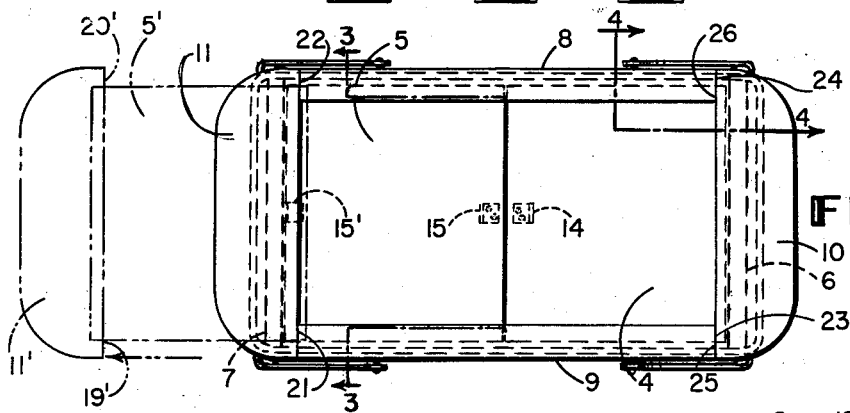
Figure 2 is a top view of Figure 1 showing one part of cover in open position.
Figure 3:
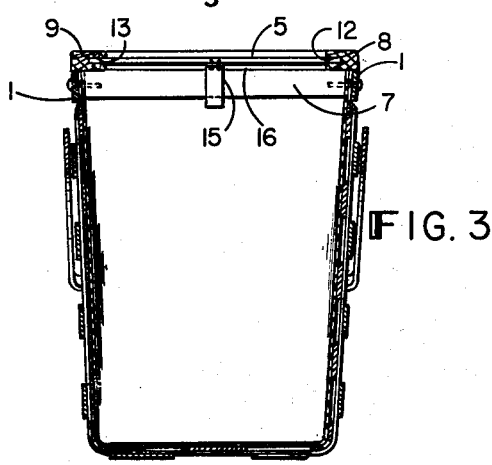
Figure 3 is a section taken on line 3—3 of Figure 2.
Figure 4:
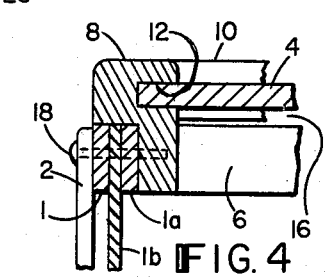
Figure 4 is a section taken on line 4—4 of Figure 2.

My basket, of the interior, exterior rim-hoop type with side splints, has a novel combination rigid rim reinforcement and sliding latch-locked split cover. The covers have transverse raised border handles which are the same height as the longitudinal runners in which the covers slide, forming a raised peripheral border around the top of the basket. The ends of the runners are separated and held firmly in place by transverse cross braces positioned below the level of the lateral grooves in which the cover slides. Depending from the inner ends of the cover portions are flexible strap catches which are adapted to contact the cross braces of the rim reinforcement and prevent the cover portions from sliding out. The space between the bottom of a cover section and the top of a cross brace allows a cover section with a depending flexible catch to slip into place, but prevents it from being disengaged.

Referring to the drawings, the basket therein shown has an exterior rim hoop 1, an interior rim hoop 1a with side splints 1b.

Positioned within the interior rim hoop is a rigid reinforcing rim brace comprising shaped longitudinal border runners 8 and 9 separated at their ends by transverse crossbraces 6 and 7. This rigid framework keeps the runners parallel and also the cover grooves in the same plane thus preventing the sliding cover sections from binding. Bails 2 and 3 have pivots 18 which pass through hoops 1 and 1a and splints 1b and are anchored in the depending portions of runners 8 and 9. The cover is split transversely into two sections 4 and 5. Section 5' indicates section 5 in an open position. Cover sections 4 and 5 have transverse raised border handles 10 and 11 on their outer ends, and flexible depending catches 14 and 15 attached adjacent the lower surfaces of their inner ends. The runners 8 and 9 have lateral horizontal grooves 12 and 13 positioned in their depending shank portions.

Between the bottom of the sliding cover section 4 and the top of cross brace 6 is an opening 16. Through this opening 16, the flexible depending catch 14 will pass when cover section 4 is inserted into the runners, the catch moving into a horizontal position. After the catch 14 passes over the transverse brace 6 its depending position automatically prevents cover section 4 from sliding out of position. Cover section 4 may be removed by manually raising catch 14 from a depending position to a horizontal position and holding it in said position while it passes through the opening 16.

Likewise there is an opening 17 positioned between the bottom of cover section 5 and the top of brace 7 through which depending catch 15 will pass on insertion of cover section 5 and through which catch 15 will not pass unless it is manually raised from a depending position to a horizontal position and is held in said position while it passes through the opening 17.

The raised handle 10 has an inner transverse edge with an abutting portion 23 on one end and an abutting portion 24 on the other end.

The raised handle 11 has an inner transverse edge with an abutting portion 19 on one end and an abutting portion 20 on the other end. When cover section 5 is inserted into grooves 13 and 12 of raised runners 9 and 8, portion 19 abuts the end 21 of runner 9 and portion 20 abuts the end 22 of runner 8. When cover section 4 is inserted into grooves 13 and 12 of raised runners 9 and 8, portion 23 abuts the end 25 of runner 9 and portion 24 abuts the end 26 of runner 8. When fully inserted, the inner transverse edges of cover sections 4 and 5 are contiguous, while the top surfaces of runner 8, runner 9, handle 10 and handle 11 are all in the same plane and raised above the top surfaces of cover sections 4 and 5.

While the preferred embodiment of my invention has been described in detail, it will be understood that I do not wish to be limited to the particular construction set forth, since various changes in the form, material, proportions, and arrangement of parts, and in the details of construction may be resorted to without departing from the spirit and scope of the invention, or destroying any of the advantages contained in the same, heretofore described and defined in the following claims.

I claim:

1. In a basket having flexible exterior and interior rim hoops, a rigid reinforcing frame with shaped parallel longitudinal components inserted within and permanently connected to said interior rim, and two flat sliding longitudinal covers, said components being provided with lateral grooves with open ends adapted to receive and cooperate with said covers, said components being separated by rigid transverse cross braces attached thereto, said covers having depending flexible means abutting said cross braces to limit the outward movement of said covers and transverse handle means abutting the ends of said components to limit the inward movement of said covers, the length of each of said covers, with said handles attached, being greater than one-half the longitudinal length of said exterior rim hoop.

2. In a basket having flexible exterior and interior rim hoops and side splints, a rigid reinforcing framework having parallel shaped longitudinal components positioned within and above the longitudinal edges of said basket and permanently attached thereto, and two flat sliding covers provided with raised transverse handles, the length of each of said covers with said handles attached being greater than one-half the longitudinal length of said exterior rim hoop, said components being provided with interior lateral grooves with open ends and separated by rigid transverse cross braces, said covers being positioned in said grooves, the top surfaces of said frame components and said handles being in the same plane, said covers having depending flexible means abutting said cross braces to limit the outward movement of said covers and transverse handle means abutting the ends of said components to limit the inward movement of said covers.

3. In a basket having flexible exterior and interior rim hoops and side splints, two flat sliding covers with transverse raised handles, shaped straight longitudinal runners and a longitudinal raised peripheral border, the length of each of said covers with said handle attached being greater than one-half the longitudinal length of said exterior rim hoop, said covers being positioned in said straight longitudinal runners, each of said shaped runners being permanently attached to said rims and having a lateral grooved portion with open ends and a vertical shank portion, said grooved portion being positioned on top of said hoops and said shank portion depending from below said grooved portion and positioned inside of said basket contiguous to said interior hoop, said runners being held in parallel spaced relationship by transverse cross braces, extending between said shank portions located at the ends of said runners, the outside top surfaces of said runners and said handles forming a peripheral raised border of uniform height around said top, the outward movement of said cover portions being limited by flexible depending catches attached adjacent the inner ends of said cover portions and adapted to abut said cross braces.

4. In a basket having flexible exterior and interior rim hoops and side splints, two sliding covers with transverse raised handles, shaped straight longitudinal runners and a longitudinal raised peripheral border, the length of each of said covers with said handle attached being greater than one-half the longitudinal length of said exterior rim hoop, said covers being positioned in said straight longitudinal runners, each of said runners having a lateral grooved portion with open ends and a vertical shank portion, said grooved portion being positioned on top of said hoops and said shank portion depending from below said grooved portion and positioned and rigidly fastened inside of said basket contiguous to said interior hoop, said runners being held in parallel spaced relationship by transverse cross braces, extending between said shank portions located at the ends of said runners, the outside of the top surfaces of said runners and said handles forming a peripheral raised border of uniform height around said top, the outward movement of said cover portions being limited by flexible depending catches attached adjacent the inner ends of said cover portions, said depending catches contacting said transverse braces and obstructing the outward movement of said cover portions, the distance between the bottom of said cover portion and the top of said transverse brace being greater than the thickness of said depending catch, said transverse handles abutting the ends of said longitudinal runners to limit the inward movement of said covers.

References Cited in the file of this patent

UNITED STATES PATENTS

| | | |
|---|---|---|
| 358,450 | Hurlburt | Mar. 1, 1887 |
| 1,456,582 | Wood et al. | May 29, 1923 |
| 2,478,470 | Eastman et al. | Aug. 9, 1949 |
| 2,808,171 | Wilson | Oct. 1, 1957 |
| 2,820,513 | Drakoff | Jan. 21, 1958 |

FOREIGN PATENTS

| | | |
|---|---|---|
| 441,488 | Italy | Nov. 2, 1948 |